US009832781B2

(12) United States Patent
Guo

(10) Patent No.: US 9,832,781 B2
(45) Date of Patent: Nov. 28, 2017

(54) METHOD FOR DEVICE-TO-DEVICE SUBSCRIBER TO DYNAMICALLY MULTIPLEX CELLULAR SUBSCRIBER RESOURCES, AND BASE STATION

(71) Applicant: ZTE CORPORATION, Shenzhen, Guangdong Province (CN)

(72) Inventor: Shengxiang Guo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 115 days.

(21) Appl. No.: 14/889,147

(22) PCT Filed: Aug. 19, 2013

(86) PCT No.: PCT/CN2013/081787
§ 371 (c)(1),
(2) Date: Dec. 8, 2015

(87) PCT Pub. No.: WO2013/189367
PCT Pub. Date: Dec. 27, 2013

(65) Prior Publication Data
US 2016/0088643 A1 Mar. 24, 2016

(30) Foreign Application Priority Data
May 7, 2013 (CN) .......................... 2013 1 0164559

(51) Int. Cl.
*H04L 1/00* (2006.01)
*H04W 72/08* (2009.01)
(Continued)

(52) U.S. Cl.
CPC ......... *H04W 72/085* (2013.01); *H04W 4/005* (2013.01); *H04W 24/08* (2013.01);
(Continued)

(58) Field of Classification Search
CPC ............................... H04B 7/00; H04B 17/00; H04B 2201/70726; H04B 7/216; H04B 3/46;
(Continued)

(56) References Cited

U.S. PATENT DOCUMENTS

2010/0093364 A1* 4/2010 Ribeiro ............... H04W 72/082
455/452.2
2011/0275382 A1 11/2011 Hakola et al.

FOREIGN PATENT DOCUMENTS

CN 101227726 A 7/2008
CN 102083138 A 6/2011
(Continued)

*Primary Examiner* — Dady Chery
(74) *Attorney, Agent, or Firm* — Ling Wu; Stephen Yang; Ling and Yang Intellectual Property

(57) ABSTRACT

A method for a device-to-device user dynamically multiplexing resources of a cellular user, which is applied to a base station side includes: when determining that the device-to-device user interferes with other cellular users within a service scope, allocating resources that meet quality of service requirements of the device-to-device user and do not cause interference to other cellular users to the device-to-device user, and instructing the device-to-device user to use the resources newly allocated.

18 Claims, 3 Drawing Sheets

(51) Int. Cl.
  *H04W 4/00*     (2009.01)
  *H04W 28/02*    (2009.01)
  *H04W 76/02*    (2009.01)
  *H04W 24/08*    (2009.01)
  *H04W 72/04*    (2009.01)

(52) U.S. Cl.
  CPC ..... *H04W 28/0289* (2013.01); *H04W 72/042* (2013.01); *H04W 72/0493* (2013.01); *H04W 72/082* (2013.01); *H04W 76/023* (2013.01)

(58) Field of Classification Search
  CPC ..... H04B 7/2121; H04B 7/2123; H04L 43/00; H04L 43/50; H04L 5/14; H04J 2203/0069; H04Q 2213/394; H04W 72/04; H04W 72/12; H04W 76/00; H04W 24/00
  USPC ....... 370/329, 252, 335, 310, 280, 347, 342; 455/450, 422.1, 63.1, 77, 561
  See application file for complete search history.

(56) References Cited

FOREIGN PATENT DOCUMENTS

| CN | 103024914 A | 4/2013 |
|---|---|---|
| WO | WO2009127963 A1 | 10/2009 |
| WO | 2011088609 A1 | 7/2011 |
| WO | 2012129806 A1 | 10/2012 |
| WO | 2012159270 A1 | 11/2012 |

\* cited by examiner

METHOD FOR DEVICE-TO-DEVICE SUBSCRIBER TO DYNAMICALLY MULTIPLEX CELLULAR SUBSCRIBER RESOURCES, AND BASE STATION

TECHNICAL FIELD

The present document relates to the technical field of radio communications, and more particularly to, a method and a base station for a device-to-device (D2D) user dynamically multiplexing resources of a cellular user.

BACKGROUND OF THE RELATED ART

Device-to-Device (D2D) communication is a new technology that allows directly performing communication between terminals by multiplexing intra-cell resources under the control of a cellular system. It has advantages including improving the utilization rate of system spectrum, reducing battery consumption of the terminal so as to save power of the mobile station, lowering load of the base station of the cellular cell, improving the user fairness of the system, enhancing the quality of network service, consolidating the substructure and providing new services and so on; and it can solve the problem of spectrum resource shortage of the radio communication system to a certain degree.

Under the architecture of the cellular network, the D2D communication can achieve the improvement of the whole system performance by sharing cell resources. If the D2D user is allocated to orthogonal channel recourses, it will not interfere with other users in the cellular network; if the D2D user is allocated to non-orthogonal channel resources, that is, when the D2D user shares the channel recourses with other cellular users, the interference may form between the D2D user and the cellular user, when the interference is critical, it may cause the communication of the cellular user to be interrupted.

As shown in FIG. 1, there is a pair of users D1 and D2 to perform the D2D communication under the cellular network, since the user U1 is far from the D2D user in the beginning, and the cellular network designates the D2D user to share recourses of the U1, at this point the D2D user will not interfere with the cellular network. When the cellular user U1 moves to a position near to the D2D user (or when the D2D user moves so that the D2D user is near to the U1), since the U1 user and the D2D user occupy same recourses, and the interference will occur between the U1 user and the D2D user. If the interference affects the normal communication of the U1 user critically, the cellular network generally will take precedence to ensure the communication of the user U1, then the D2D user may be required to switch to the cellular network to communicate, thereby a phenomenon that the D2D user performs switching frequently may occurs. Due to the unpredictability for the movement of the cellular user and D2D user, therefore the above-mentioned problem is difficult to be avoided.

SUMMARY OF THE INVENTION

The purpose of the present document is to provide a method and a base station for a device-to-device (D2D) user dynamically multiplexing resources of a cellular user to avoid the problem that when a channel condition between the D2D user and the cellular user sharing resources with the D2D user is changed (for example, they move near to each other in the process of communication), due to mutual interference, the D2D user is forced to perform switching frequently.

To solve above-mentioned problem, the present document provides a method for a device-to-device user dynamically multiplexing resources of a cellular user, which is applied to a base station side, comprising:

when determining that a device-to-device user interferes with other cellular users within a service scope, allocating resources that meet quality of service requirements of the device-to-device user and do not cause interference to other cellular users to the device-to-device user, and instructing the device-to-device user to use the resources newly allocated.

Preferably, said allocating resources that meet quality of service requirements of the device-to-device user and do not cause interference to other cellular users to the device-to-device user comprises:

judging whether there are currently idle resources to meet the quality of service requirements of the device-to-device user; if yes, allocating the idle resources to the device-to-device user.

Preferably, said allocating resources that meet quality of service requirements of the device-to-device user and do not cause interference to other cellular users to the device-to-device user, comprises:

broadcasting a detection indicating message to the cellular user and device-to-device user within the service scope;

receiving a detection result sent by the cellular user, and allocate new resources to the device-to-device user according to the detection result and quality of service requirements reported by the device-to-device user; wherein the detection result carries a situation of the device-to-device user interfering with the cellular user that is detected by the cellular user according to the received detection indicating message.

Preferably, the detection indicating message carries information resources used for device-to-device detection that are used to instruct the device-to-device user to broadcast a sounding signal on the information resources, and further used to instruct the cellular user to listen to the sounding signal on the information resources.

Preferably, the information resources used for the device-to-device detection broadcasted by the base station are downlink resources.

Preferably, under a situation of users within the service scope all supporting a device-to-device transmission, the information resources used for the device-to-device detection broadcasted by the base station are uplink resources.

Preferably, the detection indicating message carries a detection indicating identification that is used to instruct the device-to-device user to broadcast a sounding signal on dedicated information resources, and further used to instruct the cellular user to listen to the sounding signal on dedicated information resources.

Preferably, the detection result also carries a power value of the sounding signal sent by the device-to-device user that is detected by the cellular user.

Correspondingly, the present document further provides a base station, comprising:

a resource allocating module, configured to, when determining that a device-to-device user interferes with other cellular users within a service scope, allocate resources that meet quality of service requirements of the device-to-device user and do not cause interference to other cellular users to the device-to-device user;

an indication module, configured to, instruct the device-to-device user to use the resources newly allocated by the resource allocating module.

Preferably, the resource allocating module is configured to allocate resources that meet quality of service requirements of the device-to-device user and do not cause interference to other cellular users to the device-to-device user, comprising:

judging whether there are idle resources currently to meet the quality of service requirements of the device-to-device user; if yes, allocating the idle resources to the device-to-device user.

Preferably, the resource allocating module is configured to allocate resources that meet quality of service requirements of the device-to-device user and do not cause interference to other cellular users to the device-to-device user, comprising:

broadcasting a detection indicating message to the cellular user and device-to-device user within the service scope; further used to receive a detection result sent by the cellular user, and allocate new resources to the device-to-device user according to the detection result and quality of service requirements reported by the device-to-device user;

wherein the detection result carries a situation of the device-to-device user interfering with the cellular user that is detected by the cellular user according to the received detection indicating message.

Preferably, the detection indicating message broadcasted by the resource allocating module carries information resources used for device-to-device detection that are used to instruct the device-to-device user to broadcast a sounding signal on the information resources, and further used to instruct the cellular user to listen to the sounding signal on the information resources.

Preferably, the information resources used for the device-to-device detection broadcasted by the resource allocating module are downlink resources.

Preferably, under a situation of users within the service scope all supporting a device-to-device transmission, the information resources used for the device-to-device detection broadcasted by the resource allocating module are uplink resources.

Preferably, the detection indicating message broadcasted by the resource allocating module carries a detection indicating identification that is used to instruct the device-to-device user to broadcast a sounding signal on dedicated information resources, and further used to instruct the cellular user to listen to the sounding signal on dedicated information resources.

Preferably, the detection result received by the resource allocating module also carries a power value of the sounding signal sent by the device-to-device user that is detected by the cellular user.

In one aspect, in the embodiments of the present invention, it can avoid the frequent switching of the D2D user between the D2D communication and the cellular communication, in other aspect, the resources of the cellular network can be multiplexed to the maximum extent, thereby greatly improving the transmission efficiency of the cellular network.

PREFERRED EMBODIMENTS OF THE INVENTION

The embodiments of the present invention will be illustrated in detail hereinafter in conjunction with accompanying drawings. It should be noted that, in the case of no conflict, the embodiments in the present application and features in the embodiments can be combined arbitrarily with each other.

The following embodiments will describe the integration of the D2D communication under the long term evolution (LTE) and the evolved LTE (LTE-Advanced) cellular network, but the technologies related to the present document are not limited to the LTE and LTE-advanced cellular network system, which also can be the wide band code division multiple access (WCDMA), CDMA2000, time division-synchronous code division multiple access (TD-SCDMA), global system for mobile communication (GSM) and other radio access cellular network systems.

Figure 2:
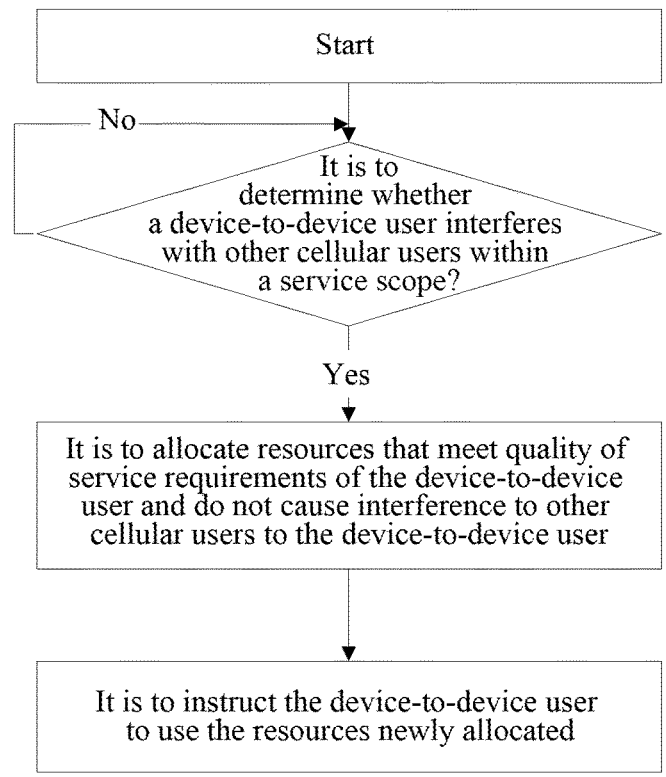
FIG. 2 is a flowchart of a method for a device-to-device user dynamically multiplexing resources of a cellular user according to the embodiment of the present invention.

In the embodiment, a method for a device-to-device user dynamically multiplexing resources of a cellular user is applied to a base station side, and as shown in FIG. 2, which comprises that:

when it is determined that the device-to-device user interferes with other cellular users within a service scope, it is to allocate resources that meet quality of service requirements of the device-to-device user and do not cause interference to other cellular users to the device-to-device user, and instruct the device-to-device user to use the resources newly allocated.

Figure 3:
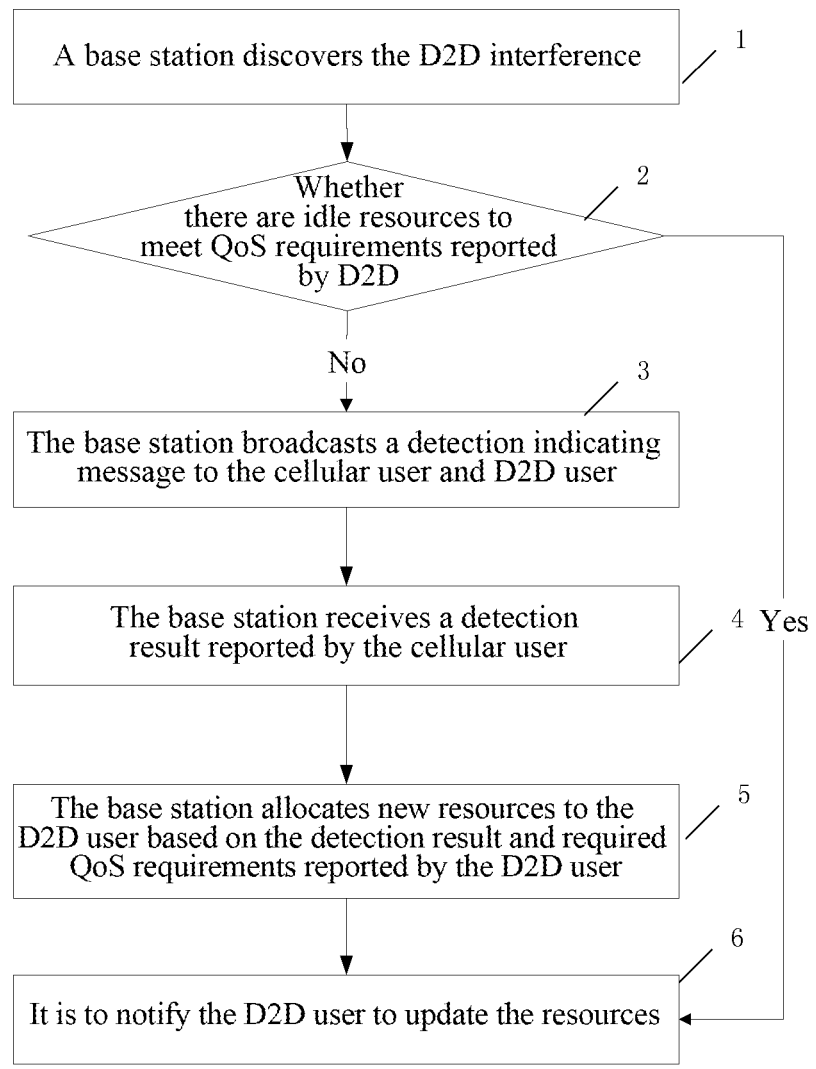
FIG. 3 is a flowchart of the specific processing of a base station side according to the embodiment of the present invention.

As shown in FIG. 3, when the base station discovers the D2D interference, it is to start to initiate the specific processing process, and the process that the base station discovers the D2D interference can be based on the report of the cellular user or the detection of the base station itself. The processing process of the base station can be divided into following steps:

In step 1, the base station firstly detects whether there are idle resources to meet QoS requirements reported by D2D;

In step 2, if a detection result is yes, it is to perform step 6, in which it is to directly notify the D2D user to perform an update to the idle resources; otherwise, it is to perform step 3;

In step 3, the base station broadcasts a detection indicating message to the cellular user and the D2D user;

One implementation way is that, the detection indicating message carries information resources used for D2D detection, and the information resources can include a timing sequence and a frequency position, etc; in order to facilitate the reception for a conventional cellular user, downlink resources are preferentially selected as the information resources used for the D2D detection that are broadcasted by the base station, for example, the physical downlink control channel (PDCCH), etc., can be occupied. If all users within the cellular network support the D2D transmission, and uplink resources also can be selected.

Another implementation way is that, if the cellular user and D2D user support the dedicated detection information resource, and the detection indicating message only carries a detection indicating identification, wherein the detection indicating identification is used to instruct the cellular user and D2D user to perform the detection preparation, and the information resources used for detection are not required to be carried in the detection indicating message additionally.

In step 4, the base station receives the detection result reported by the cellular user, and the detection result is used to indicate whether the cellular user is near to the D2D user and whether there is a potential interference risk;

In step 5, the base station allocates new resources to the D2D user based on the received detection result and the required QoS requirements reported by the D2D user;

In step 6, it is to notify the D2D user to update the resources.

Figure 1:
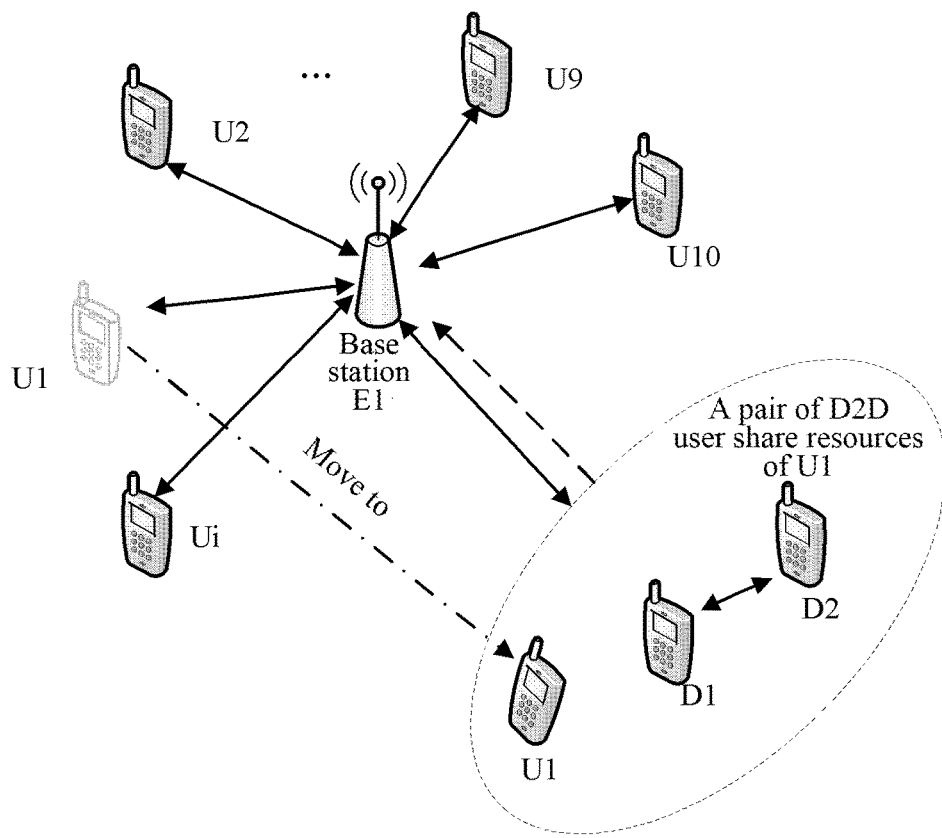
FIG. 1 is an example of allowing D2D communication under the LTE cellular network.
Figure 4:
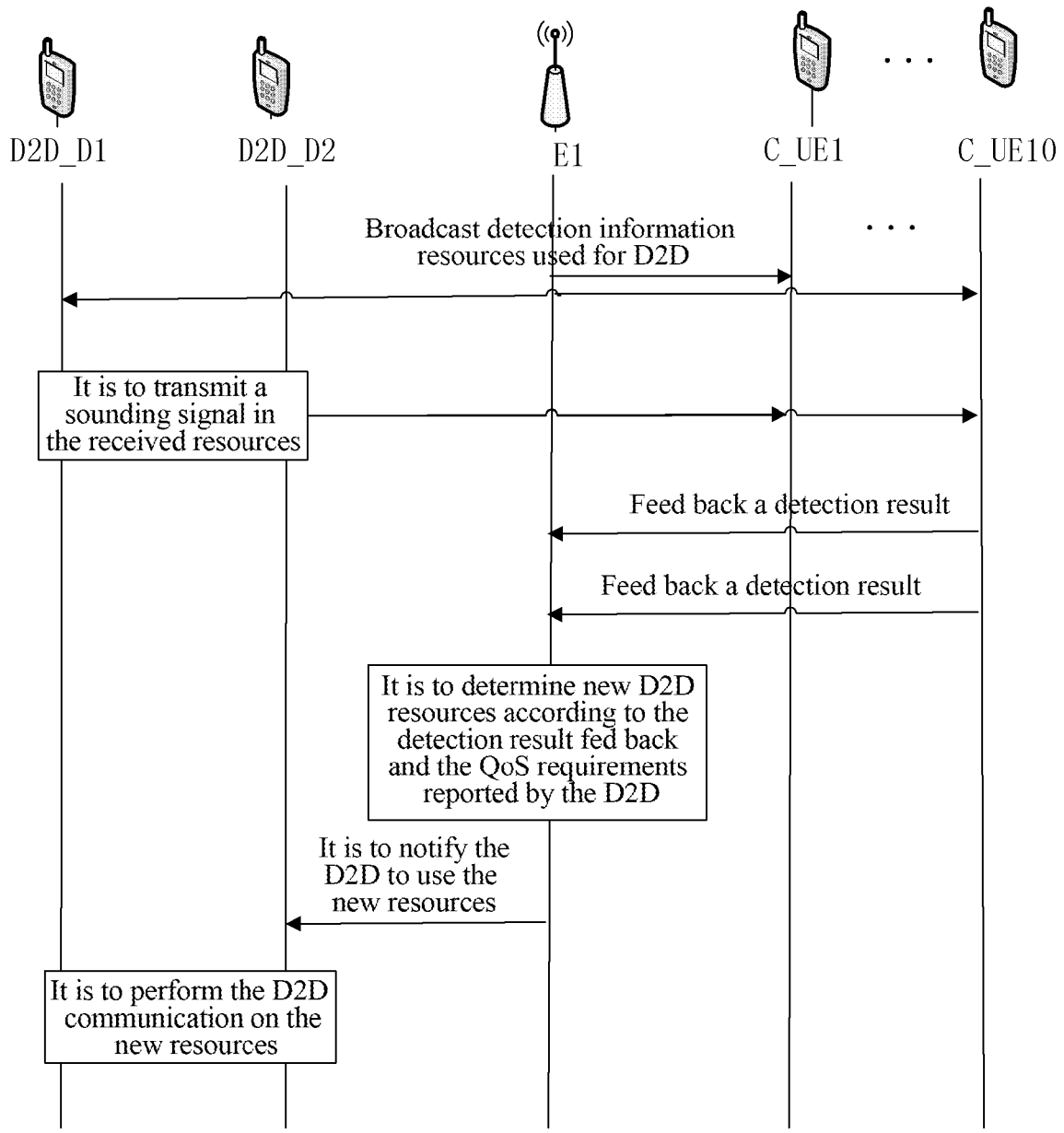
FIG. 4 is a flowchart of the cellular user and D2D user exchanging messages with the base station according to the embodiment of the present invention.

FIG. 4 is a flowchart of the cellular user and D2D user exchanging messages with the base station. It is still to take the cellular network system shown in FIG. 1 as an example. Wherein, the base station is marked E1, the cellular users are marked as C_UE1, . . . C_UE10, and the D2D users are marked as D2D_D1 and D2D_D2.

The base station broadcasts information resources used for detection to the cellular users and the D2D users. In order to facilitate the reception for a conventional cellular user, downlink resources are preferentially selected as the information resources used for detection. If it is determined that all users within the cellular network support the D2D transmission according to registration information sent by various users during accessing, and uplink resources also can be selected as the information resources used for the detection.

The D2D user occupies the specified resources to broadcast its sounding signal after receiving the information resources used for the detection that are sent by the base station. The cellular user listens to the sounding signal from the D2D user on the corresponding information resources according to the information resources used for the detection that are sent by the base station. The cellular user can judge whether the D2D user is nearby and whether there is a potential interference risk by listening to the sounding signal.

The cellular user reports the listened detection result to the base station. The reported detection result can only indicate whether there is the interference. For example, once the cellular user has detected that the power value of the sounding signal sent by D2D exceeds a set threshold, it is triggered that the detection result is reported in the uplink channel to the base station. If the cellular user cannot detect the sounding signal sent by the D2D user or has detected that the power value of the sounding signal sent by the D2D user is less than the set threshold, reporting the detection result to the base station is not triggered. In another embodiment, the reported detection result further can include the detected power level of the sounding signal sent by the D2D user; wherein, in that detection result, only one bit information is used to indicate whether there is interference, and additional bit information is used to indicate that the detected power value of the sounding signal.

The base station allocates new resources to the D2D user based on the received detection result and the required QoS requirements reported by the D2D user. The base station will take the resources of the cellular user without interference risk as alternative resources of the D2D user according to the detection result. If the alternative resources can meet the QoS requirements reported by the D2D user, the alternative resources can be taken as the preferable resources of the D2D user to be allocated to the D2D user for using through a resource updating message.

The D2D user releases the original resource and performs the communication according to the new resources allocated by the base station after receiving the resource updating message sent by the base station.

In addition, in the embodiment, a base station comprises:

a resource allocating module used to, when determining that a device-to-device user interferes with other cellular users within a service scope, allocate resources that meet quality of service requirements of the device-to-device user and do not cause interference to other cellular users to the device-to-device user;

an indication module, used to instruct the device-to-device user to use the resources newly allocated by the resource allocating module.

Preferably, the resource allocating module is used to allocate resources that meet quality of service requirements of the device-to-device user and do not cause interference to other cellular users to the device-to-device user, specifically comprising that:

the resource allocating module is configured to judge whether there are idle resources currently to meet the quality of service requirements of the device-to-device; if yes, allocate the idle resources to the device-to-device user.

Preferably, the resource allocating module is used to allocate resources that meet quality of service requirements of the device-to-device user and do not cause interference to other cellular users to the device-to-device user, specifically comprising that:

the resource allocating module is used to broadcast a detection indicating message to the cellular user and the device-to-device user within the service scope; and further used to receive a detection result sent by the cellular user, and allocate new resources to the device-to-device user according to the detection result and quality of service requirements reported by the device-to-device user;

wherein the detection result carries a situation of the device-to-device user interfering with the cellular user that is detected by the cellular user according to the received detection indicating message.

Preferably, the detection indicating message broadcasted by the resource allocating module carries information resources used for device-to-device detection that are used to instruct the device-to-device user to broadcast a sounding signal on the information resources, and further used to instruct the cellular user to listen to the sounding signal on the information resources.

Preferably, the information resources used for the device-to-device detection broadcasted by the resource allocating module are downlink resources.

Preferably, under a situation of users within the service scope all supporting the device-to-device transmission, the information resources used for the device-to-device detection broadcasted by the resource allocating module are uplink resources.

Preferably, the detection indicating message broadcasted by the resource allocating module carries a detection indicating identification that is used to instruct the device-to-device user to broadcast a sounding signal on dedicated information resources, and further used to instruct the cellular user to listen to the sounding signal on dedicated information resources.

Preferably, the detection result received by the resource allocating module also carries a power value of the sounding signal sent by the device-to-device user that is detected by the cellular user.

Those ordinarily skilled in the art can understand that all or some of steps of the above-mentioned method may be completed by the programs instructing the relevant hardware, and said programs may be stored in a computer-readable storage medium, such as read only memory, magnetic or optical disk. Optionally, all or some of the steps in the above-mentioned embodiments may also be implemented by using one or more integrated circuits. Accordingly, each module/unit in the above-mentioned embodiment may be realized in the form of hardware or software function modules. The patent document is not limited to any specific form of hardware and software combinations.

The above description is only the preferred embodiments of the present invention and is not intended to limit the protection scope of the patent document. The patent document can have a variety of other embodiments according to the content of the invention. Those skilled in the art can make the corresponding modifications and variations according to the present document without departing from the spirit and essence of the present document. All of modifications, equivalents and/or variations without departing from the spirit and essence of the present document should be embodied in the scope of the appended claims of the present document.

INDUSTRIAL APPLICABILITY

In one aspect, in the embodiments of the present invention, it can avoid the frequent switching of the D2D user between the D2D communication and the cellular communication, in other aspect, the resources of the cellular network can be multiplexed to the maximum extent, thereby greatly improving the transmission efficiency of the cellular network.

What is claimed is:

1. A method for a device-to-device user dynamically multiplexing resources of a cellular user, which is applied to a base station side, comprising:
   when determining that a device-to-device user interferes with other cellular users within a service scope, allocating resources that meet quality of service requirements of the device-to-device user and do not cause interference to other cellular users to the device-to-device user, and instructing the device-to-device user to use the resources newly allocated; wherein
   said allocating resources that meet quality of service requirements of the device-to-device user and do not cause interference to other cellular users to the device-to-device user, comprises:
   broadcasting a detection indicating message to the cellular user and device-to-device user within the service scope;
   receiving a detection result sent by the cellular user, and allocate new resources to the device-to-device user according to the detection result and quality of service requirements reported by the device-to-device user; wherein, the detection result carries a situation of the device-to-device user interfering with the cellular user that is detected by the cellular user according to the received detection indicating message.

2. The method of claim 1, wherein,
   said allocating resources that meet quality of service requirements of the device-to-device user and do not cause interference to other cellular users to the device-to-device user, comprises:
   judging whether there are idle resources currently to meet the quality of service requirements of the device-to-device user; if there are, allocating the idle resources to the device-to-device user.

3. The method of claim 2, wherein,
   said allocating resources that meet quality of service requirements of the device-to-device user and do not cause interference to other cellular users to the device-to-device user, comprises:
   broadcasting a detection indicating message to the cellular user and device-to-device user within the service scope;
   receiving a detection result sent by the cellular user, and allocate new resources to the device-to-device user according to the detection result and quality of service requirements reported by the device-to-device user; wherein, the detection result carries a situation of the device-to-device user interfering with the cellular user that is detected by the cellular user according to the received detection indicating message.

4. The method of claim 3, wherein,
   the detection indicating message carries information resources used for device-to-device detection that are used to instruct the device-to-device user to broadcast a sounding signal on the information resources, and further used to instruct the cellular user to listen to the sounding signal on the information resources.

5. The method of claim 1, wherein,
   the detection indicating message carries information resources used for device-to-device detection that are used to instruct the device-to-device user to broadcast a sounding signal on the information resources, and further used to instruct the cellular user to listen to the sounding signal on the information resources.

6. The method of claim 5, wherein,
   the information resources used for the device-to-device detection broadcasted by the base station are downlink resources.

7. The method of claim 5, wherein,
   under a situation of users within the service scope all supporting a device-to-device transmission, the information resources used for the device-to-device detection broadcasted by the base station are uplink resources.

8. The method of claim 3, wherein,
   the detection indicating message carries a detection indicating identification that is used to instruct the device-to-device user to broadcast a sounding signal on dedicated information resources, and further used to instruct the cellular user to listen to the sounding signal on dedicated information resources.

9. The method of claim 3, wherein,
   the detection result also carries a power value of a sounding signal sent by the device-to-device user that is detected by the cellular user.

10. A base station, comprising hardware performing instructions stored in a non-transitory computer readable medium which executes steps in following modules:
    a resource allocating module, configured to, when determining that a device-to-device user interferes with other cellular users within a service scope, allocate resources that meet quality of service requirements of the device-to-device user and do not cause interference to other cellular users to the device-to-device user;

an indication module, configured to instruct the device-to-device user to use the resources newly allocated by the resource allocation module; wherein:

the resource allocating module is configured to allocate resources that meet quality of service requirements of the device-to-device user and do not cause interference to other cellular users to the device-to-device user, comprising:

broadcasting a detection indicating message to the cellular user and device-to-device user within the service scope;

receiving a detection result sent by the cellular user, and allocate new resources to the device-to-device user according to the detection result and quality of service requirements reported by the device-to-device user;

wherein the detection result carries a situation of the device-to-device user interfering with the cellular user that is detected by the cellular user according to the received detection indicating message.

11. The base station of claim 10, wherein
the resource allocating module is configured to allocate resources that meet quality of service requirements of the device-to-device user and do not cause interference to other cellular users to the device-to-device user, comprising:

judging whether there are idle resources currently to meet the quality of service requirements of the device-to-device user; if yes, allocating the idle resources to the device-to-device user.

12. The base station of claim 11, wherein:
the resource allocating module is configured to allocate resources that meet quality of service requirements of the device-to-device user and do not cause interference to other cellular users to the device-to-device user, comprising:

broadcasting a detection indicating message to the cellular user and device-to-device user within the service scope;

receiving a detection result sent by the cellular user, and allocate new resources to the device-to-device user according to the detection result and quality of service requirements reported by the device-to-device user;

wherein the detection result carries a situation of the device-to-device user interfering with the cellular user that is detected by the cellular user according to the received detection indicating message.

13. The base station of claim 12, wherein
the detection indicating message broadcasted by the resource allocating module carries information resources used for device-to-device detection that are used to instruct the device-to-device user to broadcast a sounding signal on the information resources, and further used to instruct the cellular user to listen to the sounding signal on the information resources.

14. The base station of claim 10, wherein
the detection indicating message broadcasted by the resource allocating module carries information resources used for device-to-device detection that are used to instruct the device-to-device user to broadcast a sounding signal on the information resources, and further used to instruct the cellular user to listen to the sounding signal on the information resources.

15. The base station of claim 14, wherein
the information resources used for the device-to-device detection broadcasted by the resource allocating module are downlink resources.

16. The base station of claim 14, wherein
under a situation of users within the service scope all supporting a device-to-device transmission, the information resources used for the device-to-device detection broadcasted by the resource allocating module are uplink resources.

17. The base station of claim 10, wherein
the detection indicating message broadcasted by the resource allocating module carries a detection indicating identification that is used to instruct the device-to-device user to broadcast a sounding signal on dedicated information resources, and further used to instruct the cellular user to listen to the sounding signal on dedicated information resources.

18. The base station of claim 10, wherein
the detection result received by the resource allocating module also carries a power value of a sounding signal sent by the device-to-device user that is detected by the cellular user.

* * * * *